US007055960B2

(12) United States Patent
Chang et al.

(10) Patent No.: US 7,055,960 B2
(45) Date of Patent: Jun. 6, 2006

(54) REAR PROJECTION DISPLAY DEVICE

(75) Inventors: Kun-Rong Chang, Miao-Li (TW);
Kuo-Wen Chen, Miao-Li (TW)

(73) Assignee: Coretronic Corporation, Miao-Li (TW)

( * ) Notice: Subject to any disclaimer, the term of this patent is extended or adjusted under 35 U.S.C. 154(b) by 62 days.

(21) Appl. No.: 10/709,102

(22) Filed: Apr. 14, 2004

(65) Prior Publication Data

US 2004/0218107 A1    Nov. 4, 2004

(30) Foreign Application Priority Data

Apr. 30, 2003  (TW) ............................ 92208048 U

(51) Int. Cl.
*G03B 21/28* (2006.01)
*H04N 5/64* (2006.01)

(52) U.S. Cl. ..................... 353/77; 353/72; 353/119; 348/745; 348/794; 348/786

(58) Field of Classification Search ............. 359/460, 359/449, 453; 348/787–789, 794, 761, 745–747, 348/786; 353/47, 50, 51, 72–80, 97, 98, 353/119

See application file for complete search history.

(56) References Cited

U.S. PATENT DOCUMENTS

| 5,829,855 | A  | * | 11/1998 | Uchiyama ................... 353/74 |
| 5,886,818 | A  | * | 3/1999  | Summer et al. ............ 359/478 |
| 6,527,397 | B1 | * | 3/2003  | Furuichi et al. ............ 353/119 |
| 6,598,976 | B1 | * | 7/2003  | Westort et al. ............. 353/28 |
| 6,767,099 | B1 | * | 7/2004  | Perkins et al. .............. 353/10 |

FOREIGN PATENT DOCUMENTS

JP          04293377 A   * 10/1992

* cited by examiner

*Primary Examiner*—William Perkey
*Assistant Examiner*—Andrew Sever
(74) *Attorney, Agent, or Firm*—Winston Hsu

(57) ABSTRACT

A rear projection display device includes an image generator, a reflector, a screen and a light shield disposed between the reflector and the screen. The image engine emits image beams among which ineffective ones are blocked by the light shield while effective ones are reflected on the screen via the reflector, thereby increasing the image forming performance of the displace device. The light shield is mounted on an adjusting device having an adjusting element. After the rear projection display device has been assembled, an angle and position of the light shield can be adjusted by means of rotating the adjusting element to further help the light shield to block the ineffective beams.

2 Claims, 4 Drawing Sheets

REAR PROJECTION DISPLAY DEVICE

BACKGROUND OF INVENTION

1. Field of the Invention

The invention relates to a rear projection display device, and more particularly to a rear projection display device in which a light shield blocks scattered lights.

2. Description of the Prior Art

Referring to FIG. 1, a conventional rear projection display device 10 includes an image generator 11, a small reflector 12, a large reflector 13 and a screen 14. The small reflector 12 is mounted at a front of the image generator 11. The screen 14 is mounted at a front of the display device 10. The large reflector 13 is mounted at a rear of the screen 14 in a reflecting path of the small reflector 12. The image generator 11 provides image beams 111 that are reflected via the small and large mirrors 12, 13 to project onto the screen 14.

An image displaying element 112 such as digital micromirror device (DMD), a liquid crystal panel or Liquid Crystal On Silicon (LCOS) panel in the image generator 11 projects image beams including ineffective beams onto the screen 14 to generate images including scattered images that are formed by the ineffective beams. The image beams may include image beams 111A, 111B and 111C. The image beams 111A may not be projected onto the small reflector 12 but the screen 14. The image beams 111B may be projected at a periphery of the small reflector 12, and then reflected onto the screen 14 via the small reflector 12. The ineffective beams 111C may be reflected onto the screen 14 via the small reflector 12 or the large reflector 13.

There are several approaches to overcome the above disadvantages. For example, a light shield 1131 is attached on a lens 113 of the image generator 11 as shown in FIG. 2. Alternatively, a light shield 1121 is attached into the image displaying element 112 to block the image beams from being projected onto ineffective areas of the screen, as shown in FIG. 3. However, the light shields 1121, 1131 tend to block the image beams that are to be projected at effective areas of the screen. The size of the light shield 1121, 1131 cannot be exactly controlled, and the light shield cannot be adjusted, neither. Therefore, adding the light shield cannot effectively avoid the adverse affect of the images at the ineffective areas on the displayed image quality.

SUMMARY OF INVENTION

One object of the invention is to provide a rear projection display device, in which a light shield is mounted to avoid scattered images formed on a screen, thereby improving image forming performance.

Another object of the invention is to provide a rear projection display device, in which a light shield is mounted between a reflector and a screen for conveniently adjusting the light shield after the rear projection display device has been assembled.

In order to achieve the above and other objectives, the rear projection display device of the invention includes an image generator, a reflector, a screen, and a light shield mounted between the reflector and the screen. The image engine emits image beams among which ineffective ones are blocked by the light shield while effective ones are reflected on the screen via the reflector, thereby increasing the image forming performance of the displace device. The light shield is mounted on an adjusting device having an adjusting element. After the rear projection display device has been assembled, a tile angle and position of the light shield can be adjusted by means of rotating the adjusting element to further help the light shield to block the ineffective beams.

To provide a further understanding of the invention, the following detailed description illustrates embodiments and examples of the invention, this detailed description being provided only for illustration of the invention.

BRIEF DESCRIPTION OF DRAWINGS

The drawings included herein provide a further understanding of the invention. A brief introduction of the drawings is as follows.

DETAILED DESCRIPTION

Figure 1:
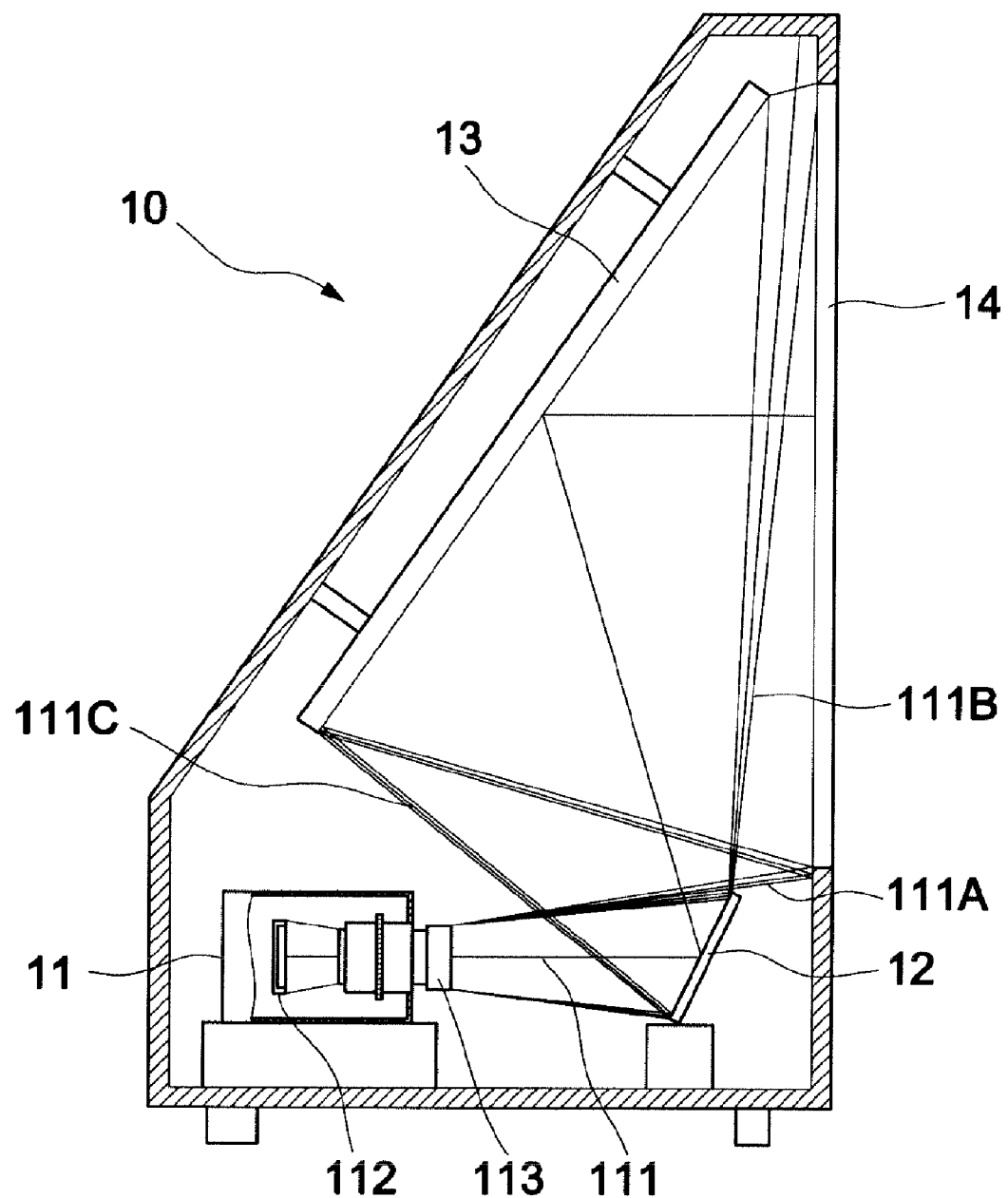
FIG. 1 is a schematic view of a conventional rear projection display device.
Figure 2:
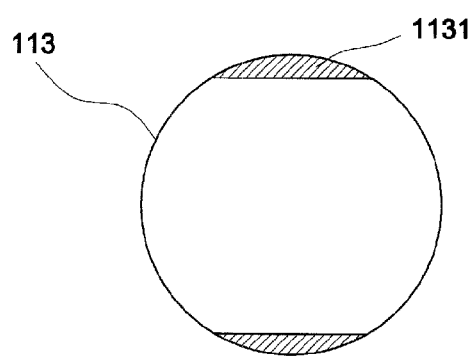
FIG. 2 is a front view of a conventional lens having a light shield.
Figure 3:
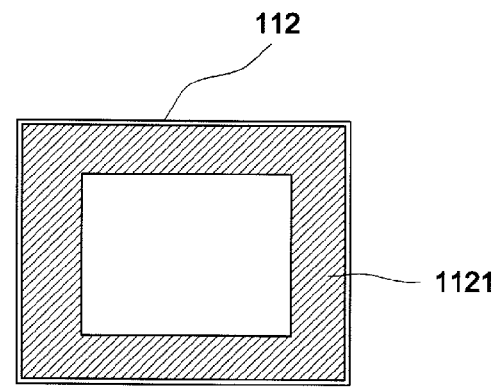
FIG. 3 is a front view of a conventional image displaying element having a light shield.

Wherever possible in the following description, like reference numerals will refer to like elements and parts unless otherwise illustrated.

Figure 4:
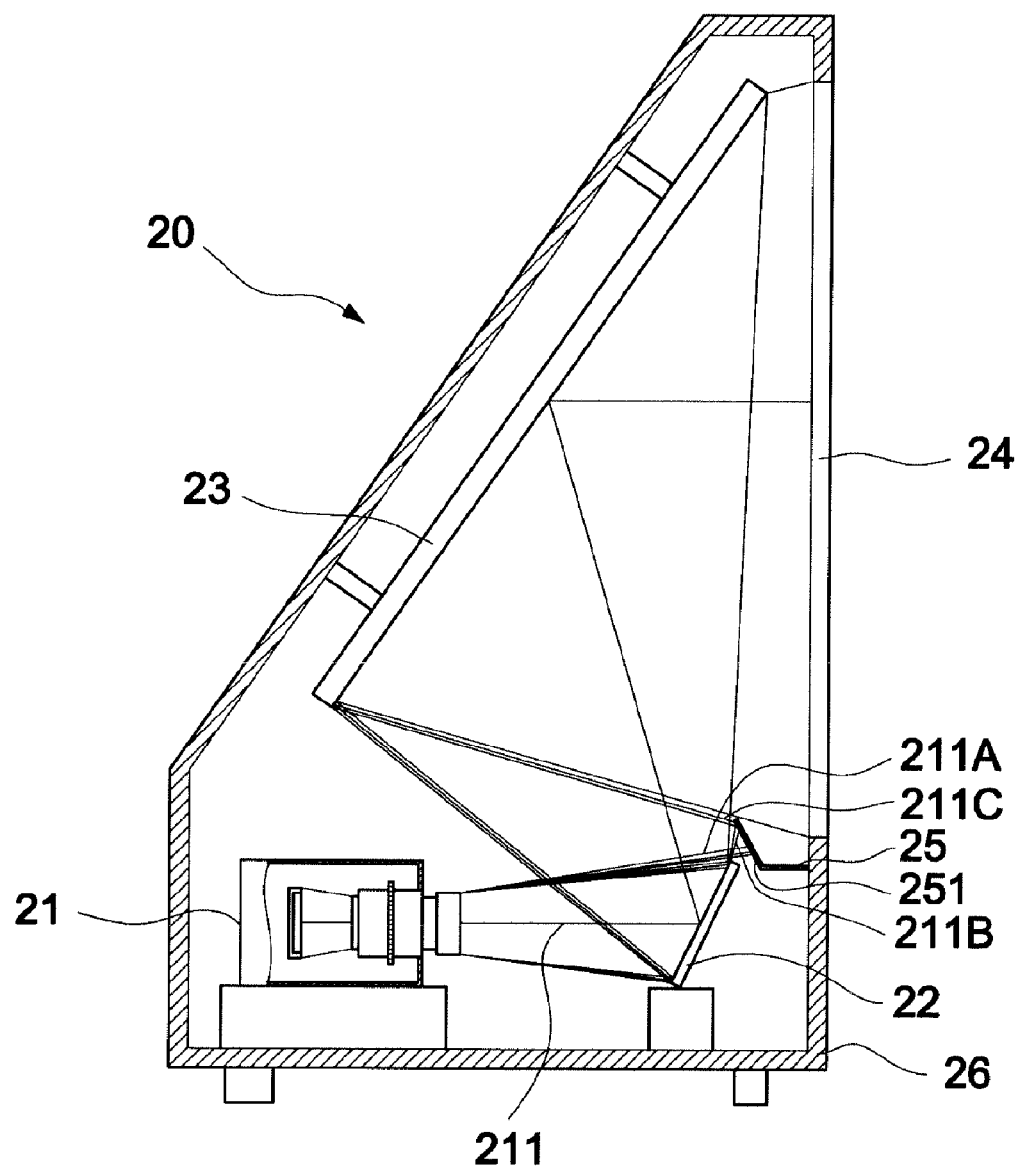
FIG. 4 is a schematic view of a rear projection device according to one embodiment of the invention.

Referring to FIG. 4, the rear projection display device 20 includes an image generator 21, a reflector 22, a large reflector 23, a screen 24 and a light shield 25. The image generator 21 provides at least one image beam 211. The reflector 22 is mounted at a front 21 of the image generator 21. The screen 24 is mounted at a front of the display device 20. The large reflector 23 is mounted at a rear of the screen 24 in a light reflecting path of the reflector 22. The light shield 25 is mounted between the reflector 22 and the screen 24. The light shield 25 can be of any shape and at any position as long as scattered beams can be prevented from being projected onto the screen 24. The light shield 25 has a surface 251 made of light absorbable material as an ineffective-beam incident surface that absorbs the ineffective beams to prevent any projection of the ineffective beams onto the screen 24. The image engine 21 emits image beams among which ineffective ones are blocked by the light shield while effective ones are reflected on the screen 24 via the reflector 22 and the large reflector 23.

In this embodiment, one end of the light shield 25 is mounted on a casing of the display device 20 under the screen 24. The other end of the light shield 25 extends upward with a tilt angle to block the ineffective beams that are to be projected on the screen. The tile angle and the position of the light shield 25 are determined according to light reflecting angles of the reflector 22 and the large reflector 23 and the areas of the screen where the ineffective beams are to be distributed over. The ineffective beams include ineffective beams 211A, 211B, and 211C. The ineffective beams 211A travel over the reflector 22 to project on the screen 24. The ineffective beams 211B are reflected via the reflector 22 to project above the screen 24. The ineffective beams 211C are reflected via the reflector 22 and the large reflector 23 to project at the periphery of the screen 24. All the ineffective beams 211A, 211 and 211C are blocked by the light shield 25 and thus not projected onto the screen 24. Only the effective beams are allowed to project on the screen 24, thereby increasing the image forming performance.

Since the light shield 25 is mounted between the reflector 22 and the screen 24, the image formed at this position is magnified with compared to the position in the image generator 21. Therefore, blocking ineffective beams of the light shield 25 at this position can be more easily and exactly controlled than other positions.

Figure 5:
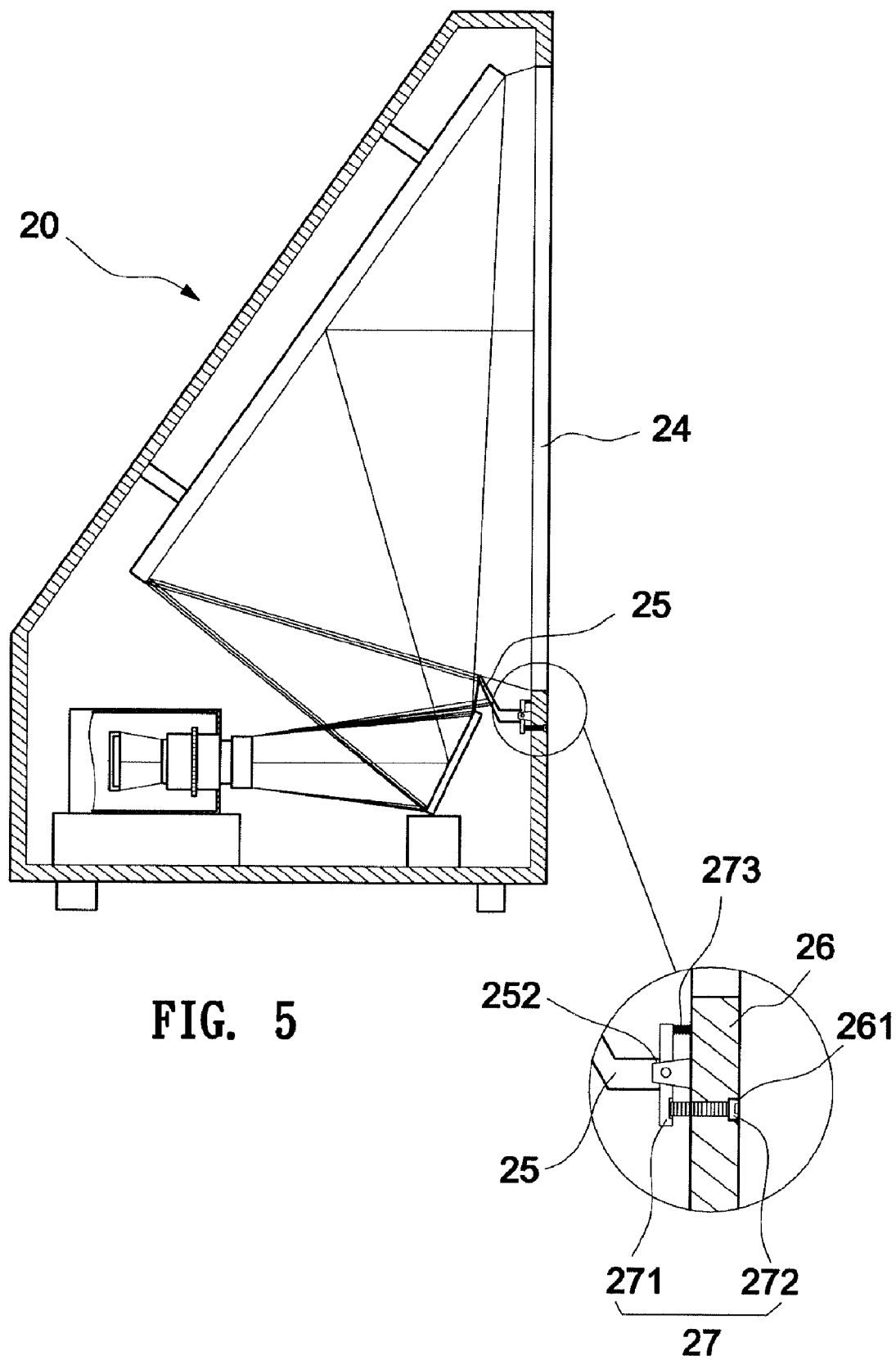
FIG. 5 is a schematic view of a rear projection device according to another embodiment of the invention.

Referring to FIG. 5, after a fixing end 252 of the light shield 25 connects to an adjusting device 27, the light shield 25 and the adjusting device 27 can be assembled on the casing 26. The adjusting device 27 includes an adjusting base 271 and at least one adjusting element 272. The adjusting base 271 is pivotally mounted on the casing 26. The light shield 25 is mounted on the adjusting base 271. The adjusting element 272 penetrates through an adjusting hole 261 of the casing 26 to abut against a first end of the adjusting base 271. An elastic element 273 abuts against a second end of the adjusting base 271. A sliding means (not shown) can be further provided above the adjusting base 271 to linearly adjust the position of the light shield 25. After the rear projection display device 20 has been assembled, the angle and position of the light shield 25 can be easily controlled through the adjusting hole 261 by rotating the adjusting element 272. Thereby, the light shield 25 effectively blocks the ineffective beams that are to be projected on the screen 24.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A rear projection display device, comprising:
   an image generator, providing image beams;
   a reflector, mounted at a front of the image generator to reflect the image beams onto a screen;
   a light shield, mounted on an adjusting device and disposed between the reflector and the screen to block scattered beams that are to be projected onto the screen; and
   a casing having at least one adjusting hole that corresponds to one adjusting element of the adjusting device.

2. A rear projection display device, comprising:
   an image generator, providing image beams;
   a reflector, mounted at a front of the image generator to reflect the image beams onto a screen;
   a light shield, mounted on an adjusting device and disposed between the reflector and the screen for blocking scattered beams reflected by the reflector from being projected onto the screen; and
   a casing having at least one adjusting hole that corresponds to one adjusting element of the adjusting device.

* * * * *